United States Patent
Ferguson et al.

(10) Patent No.: US 11,691,127 B2
(45) Date of Patent: Jul. 4, 2023

(54) PROCESS FOR PREPARATION OF A SUPPORTED COBALT-CONTAINING FISHCER-TROPSCH SYNTHESIS

(71) Applicant: BP P.L.C., London (GB)

(72) Inventors: Ewen Ferguson, Yorkshire (GB); Alexander Paterson, Yorkshire (GB)

(73) Assignee: BP P.L.C., London (GB)

(*) Notice: Subject to any disclaimer, the term of this patent is extended or adjusted under 35 U.S.C. 154(b) by 121 days.

(21) Appl. No.: 15/533,516

(22) PCT Filed: Dec. 21, 2015

(86) PCT No.: PCT/EP2015/080745
§ 371 (c)(1),
(2) Date: Apr. 3, 2018

(87) PCT Pub. No.: WO2016/097402
PCT Pub. Date: Jun. 23, 2016

(65) Prior Publication Data
US 2019/0046960 A1 Feb. 14, 2019

(30) Foreign Application Priority Data
Dec. 19, 2014 (EP) .................................... 14199348

(51) Int. Cl.
*B01J 23/75* (2006.01)
*B01J 35/02* (2006.01)
(Continued)

(52) U.S. Cl.
CPC ............. *B01J 23/75* (2013.01); *B01J 23/78* (2013.01); *B01J 23/80* (2013.01); *B01J 23/825* (2013.01);
(Continued)

(58) Field of Classification Search
CPC .. B01J 23/75; B01J 2523/845; B01J 37/0027; B01J 37/02; B01J 37/0063; B01J 35/023; B01J 35/1014
See application file for complete search history.

(56) References Cited

U.S. PATENT DOCUMENTS 4,794,099 A * 12/1988 Iglesia .................... B01J 23/75
502/241
6,130,184 A    10/2000 Geerlings et al.
(Continued)

FOREIGN PATENT DOCUMENTS

EP     0 428 223 A1    5/1991
JP     2010-221108 A   10/2010
(Continued)

OTHER PUBLICATIONS

Barrett et al., "The Determination of Pore Volume and Area Distributions in Porous Substances. I. Computations from Nitrogen Isotherms" *Journal of the American Chemical Society*, vol. 73: 373-380 (Jan. 1951).
(Continued)

*Primary Examiner* — Jun Li
(74) *Attorney, Agent, or Firm* — McDonnell Boehnen Hulbert & Berghoff LLP (57) ABSTRACT

The present invention relates to a process for preparing a cobalt-containing Fischer-Tropsch synthesis catalyst with good physical properties and high cobalt loading. In one aspect, the present invention provides a process for preparing a supported cobalt-containing Fischer-Tropsch synthesis
(Continued)

catalyst, said process comprising the following steps of: (a) impregnating a support powder or granulate with a cobalt-containing compound; (b) calcining the impregnated support powder or granulate and extruding to form an extrudate; or extruding the impregnated support powder or granulate to form an extrudate and calcining the extrudate; and (c) impregnating the calcined product with a cobalt-containing compound; or forming a powder or granulate of the calcined product, impregnating with a cobalt-containing compound and extruding to form an extrudate.

20 Claims, 5 Drawing Sheets (51) Int. Cl.
| | |
|---|---|
| B01J 35/10 | (2006.01) |
| B01J 37/00 | (2006.01) |
| B01J 37/02 | (2006.01) |
| B01J 37/08 | (2006.01) |
| C10G 2/00 | (2006.01) |
| B01J 37/18 | (2006.01) |
| B01J 35/00 | (2006.01) |
| B01J 23/83 | (2006.01) |
| B01J 23/78 | (2006.01) |
| B01J 23/889 | (2006.01) |
| B01J 23/80 | (2006.01) |
| B01J 23/85 | (2006.01) |
| B01J 23/89 | (2006.01) |
| B01J 23/825 | (2006.01) |
| B01J 37/16 | (2006.01) |

(52) U.S. Cl.
CPC ............ *B01J 23/83* (2013.01); *B01J 23/85* (2013.01); *B01J 23/889* (2013.01); *B01J 23/8913* (2013.01); *B01J 35/002* (2013.01); *B01J 35/023* (2013.01); *B01J 35/10* (2013.01); *B01J 35/1014* (2013.01); *B01J 37/0009* (2013.01); *B01J 37/0036* (2013.01); *B01J 37/0063* (2013.01); *B01J 37/02* (2013.01); *B01J 37/0205* (2013.01); *B01J 37/08* (2013.01); *B01J 37/088* (2013.01); *B01J 37/16* (2013.01); *B01J 37/18* (2013.01); *C10G 2/332* (2013.01); *B01J 2523/3706* (2013.01); *B01J 2523/3712* (2013.01); *B01J 2523/395* (2013.01); *B01J 2523/68* (2013.01); *B01J 2523/69* (2013.01); *B01J 2523/821* (2013.01); *B01J 2523/822* (2013.01); *B01J 2523/824* (2013.01); *B01J 2523/828* (2013.01); *B01J 2523/842* (2013.01); *B01J 2523/845* (2013.01); *B01J 2523/847* (2013.01); *C10G 2300/70* (2013.01)

(56) References Cited

U.S. PATENT DOCUMENTS

| | | | |
|---|---|---|---|
| 6,262,132 B1* | 7/2001 | Singleton | C07C 1/0435 |
| | | | 518/700 |
| 8,598,063 B2 | 12/2013 | Sato et al. | |
| 8,841,229 B2* | 9/2014 | Terorde | B01J 23/002 |
| | | | 502/259 |
| 2003/0139286 A1* | 7/2003 | Van Berge | C07C 1/0445 |
| | | | 502/185 |
| 2003/0153633 A1* | 8/2003 | Geerlings | C10G 2/333 |
| | | | 518/716 |
| 2005/0165121 A1 | 7/2005 | Wang et al. | |
| 2007/0123594 A1* | 5/2007 | Dogterom | C10G 47/12 |
| | | | 518/716 |
| 2008/0262115 A1 | 10/2008 | Calis | |
| 2010/0065782 A1 | 3/2010 | Dierickx et al. | |
| 2010/0093876 A1* | 4/2010 | Gaemers | B01J 23/80 |
| | | | 518/715 |
| 2010/0160464 A1 | 6/2010 | Kibby et al. | |
| 2011/0230572 A1* | 9/2011 | Allison | B01J 21/005 |
| | | | 518/700 |
| 2011/0313061 A1* | 12/2011 | Wright | B01J 37/18 |
| | | | 518/700 |
| 2012/0071571 A1 | 3/2012 | Abbas et al. | |
| 2012/0214664 A1* | 8/2012 | Mordkovich | B01J 23/462 |
| | | | 502/74 |
| 2013/0324623 A1 | 12/2013 | Maury et al. | |
| 2014/0045952 A1 | 2/2014 | Sandee et al. | |
| 2014/0155501 A1* | 6/2014 | Van Rensburg | B01J 37/088 |
| | | | 518/715 |
| 2016/0296913 A1* | 10/2016 | Takahama | B01J 35/1061 |

FOREIGN PATENT DOCUMENTS

| | | | |
|---|---|---|---|
| WO | WO 99/34917 | 7/1999 | |
| WO | WO-2004028687 A1 * | 4/2004 | ............ B01J 21/063 |
| WO | WO 2008/003731 | 1/2008 | |
| WO | WO 2008/090105 A2 | 7/2008 | |
| WO | WO 2008/090105 A3 | 7/2008 | |
| WO | WO 2011/062773 | 5/2011 | |
| WO | WO 2011/094618 A1 | 8/2011 | |

OTHER PUBLICATIONS

Bunauer et al., "Adsorption of Gases in Multimolecular Layers" *Journal of the American Chemical Society*, vol. 60: 309-319 (Feb. 1938).
International Search Report issued in PCT/EP2015/080745 dated Mar. 16, 2016.
International Search Report for PCT/EP2015/080745, 4 pages, dated Mar. 16, 2016.
Mardkhe, et al., "Synthesis and characterization of silica doped alumina catalyst support with superior thermal stability and unique pore properties," J. Porous Mat., 23, 475-87 (2016).
Zhang, et al., "Thermal and hydrothermal stability of pure and silica-doped mesoporous aluminas," Microporous and Mesoporous Mat., 284, 60-68 (2019).

* cited by examiner

PROCESS FOR PREPARATION OF A SUPPORTED COBALT-CONTAINING FISHCER-TROPSCH SYNTHESIS

This application is the U.S. national phase of International Application No. PCT/EP2015/080745 filed Dec. 21, 2015 which designated the U.S. and claims priority to European Patent Application No. 14199348.5 filed Dec. 19, 2014, the entire contents of each of which are hereby incorporated by reference.

This invention relates to a process for preparing a supported Fischer-Tropsch synthesis catalyst. In particular, the invention relates to a process for preparing a supported cobalt-containing Fischer-Tropsch synthesis catalyst, which process comprises steps to increase the cobalt metal content of the supported catalyst in order to increase the activity of the reduced catalyst. Furthermore, by providing a catalyst with increased catalytic activity, it is possible to obtain improved selectivity for $C_{5+}$ hydrocarbons in Fischer-Tropsch reactions, for the same level of conversion, through operation at lower temperatures.

The conversion of synthesis gas into hydrocarbons by the Fischer-Tropsch process has been known for many years. The growing importance of alternative energy sources has seen renewed interest in the Fischer-Tropsch process as one of the more attractive direct and environmentally acceptable routes to high quality transportation fuels.

Many metals, for example cobalt, nickel, iron, molybdenum, tungsten, thorium, ruthenium, rhenium and platinum are known to be catalytically active, either alone or in combination, in the conversion of synthesis gas into hydrocarbons and oxygenated derivatives thereof. Of the aforesaid metals, cobalt, nickel and iron have been studied most extensively. Generally, the metals are used in combination with a support material, of which the most common are alumina, silica and carbon.

In the preparation of cobalt-containing Fischer-Tropsch catalysts, a solid support is typically impregnated with a cobalt-containing compound, which may for instance be an organometallic or inorganic compound (e.g. $Co(NO_3)_2.6H_2O$), by contacting with a solution of the compound. The particular form of cobalt-containing compound is generally selected for its ability to form cobalt oxide ($Co_3O_4$) following a subsequent calcination/oxidation step. Following generation of the supported cobalt oxide, a reduction step is typically employed in order to form the pure cobalt metal as the active catalytic species. Thus, the reduction step is also commonly referred to as an activation step.

It is generally understood that selectivity for $C_{5+}$ hydrocarbons in the Fischer-Tropsch synthesis reaction is increased by operating at lower temperatures. By providing a catalyst of higher activity, it is possible to achieve the same level of synthesis gas conversion at lower temperatures whilst benefitting from improved $C_{5+}$ hydrocarbon selectivity. As such, a catalyst of higher activity also represents a means for modifying the selectivity of the Fischer-Tropsch synthesis by allowing a reduction in operating temperature.

It is known to be beneficial to perform Fischer-Tropsch catalysis with an extrudate, particularly in the case of fixed catalyst bed reactor systems. It is, for instance, known that, for a given shape of catalyst particles, a reduction in the size of the catalyst particles in a fixed bed gives rise to a corresponding increase in pressure drop through the bed. Thus, the relatively large extrudate particles cause less of a pressure drop through the catalyst bed in the reactor compared to the corresponding powdered or granulated supported catalyst. It has also been found that extrudate particles generally have greater strength and experience less attrition, which is of particular value in fixed bed arrangements where bulk crush strength should be high.

An impregnated extrudate may be formed by mixing a solution of a cobalt-compound with a support material particulate, mulling, extruding to form an extrudate before drying and calcining. Alternatively, an extrudate of a support material is directly impregnated, for instance by incipient wetness, before drying and calcining. The latter technique may avoid mulling and extrusion steps by sourcing a commercially available extrudate support material. However, this imposes limitations on the particular shape and size of the resulting impregnated extrudate prepared, which can be disadvantageous when designing an extrudate catalyst for the conditions of a particular reactor system. Furthermore, impregnating a preformed extrudate has been found to afford a catalyst which is less active and/or selective when compared to a support particulate which has been impregnated and then extruded. For these reasons, it is often preferred to start from a support material particulate, rather than a preformed extrudate.

A major problem with forming cobalt-containing extrudates is that there is a substantial limitation on the concentration of cobalt that may be achieved on the supported catalyst in a single impregnation step. As described for instance in WO 2011/062773 and WO 99/34917, starting from a commercially available preformed extrudate, a single impregnation step with a solution of a cobalt-containing compound is considered incapable of achieving a cobalt metal loading of above 10 wt. %. This is a result of the restricted pore volume of the extruded support material and the solubility of the cobalt-containing compound in the impregnating solution. As such, multiple impregnations are typically required to afford extrudates with metal loadings which may only be marginally higher, yet for significant additional costs.

Complications also arise where an impregnated extrudate is instead obtained by mixing a support material particulate together with a solution of a cobalt-containing compound and extruding. For instance, the higher levels of solvent that are required for dissolving the increased amounts of cobalt-containing compound required for higher cobalt loading by means of a single impregnation step means that when the solution is mixed with the support material particulate, a mixture is obtained which is not readily extruded.

WO 99/34917 teaches a process for forming an extrudate with appreciably higher cobalt metal loading of, for instance, 20 wt. %, through a single impregnation with a partially undissolved solution (a 'solid solution') of a cobalt-containing compound. Such a solid solution may be formed by precipitation of the cobalt compound following the addition of a base to a solution of soluble cobalt-containing compound. Although the method reported in WO 99/34917 is capable of forming extrudates with higher cobalt metal loadings, and thus higher catalyst activities, than was previously possible in a single impregnation step, the extrudates obtained by this method suffer from low bulk crush strength and poor morphology. This is believed to be because undissolved cobalt-containing compound plays a substantial role in the formation of bubbles on the surface and throughout the support material, which can manifest in problems of poor morphology, low mechanical strength (e.g. crush strength), lower particle density (hence lower activity) and poor reproducibility of catalyst performance.

Thus, in obtaining higher cobalt metal loading, the advantages associated with using an extrudate are in effect negated. Furthermore, the use of a solid solution for impregnating the support material particulate can lead to a poor dispersion of cobalt-containing compound over the surface and in the pores of the support material which can negatively impact upon catalyst performance and lifetime.

WO 2008/003731 also teaches the use of a solid solution (reference being made therein to the solid solutions according to WO 99/34917) in order to obtain high cobalt metal loading in an extrudate. In the process disclosed in that document, particles of a fresh catalyst material having particle sizes of 1 to 100 µm are admixed with the cobalt-containing compound and one or more carrier materials prior to shaping, for instance, by extrusion. The use of the micro-particulate is said to beneficially increase the degree of porosity in the resulting catalyst. However, WO 2008/003731 does not identify or address the problems of poor morphology which result from impregnating a support material with a solid solution of a cobalt-containing compound, in order to give high cobalt metal loading.

There remains a need for an alternative process for producing an extruded Fischer-Tropsch synthesis catalyst with high cobalt loading, so that the reduced catalyst benefits from higher activity, yet retains good physical properties, including bulk crush strength and morphology. Moreover, there remains a need for an alternative process for preparing a catalyst where the reduced catalyst exhibits improved selectivity for $C_{5+}$ hydrocarbons in subsequent Fischer-Tropsch reactions, which hydrocarbons are of most value for preparing fuel compositions.

It has now surprisingly been found that a supported cobalt-containing Fischer-Tropsch catalyst having high cobalt metal loading, for instance, in significant excess of 10 wt. %, may be prepared by using impregnating solutions of cobalt-containing compound, preferably wherein the cobalt-containing compound is fully dissolved, without compromising physical properties of the supported catalyst. This is achieved by performing multiple impregnations of a support, to incrementally increase the cobalt loading of the resulting supported synthesis catalyst, and ensuring that a calcination step is performed between each impregnation step. Benefits of the present invention can even be realised where solid solutions comprising partially undissolved cobalt-containing compound are used.

The support material may be in the form of a powder or granulate, or a powder or granulate may be formed during the process, in which case an extrusion step is included to provide an extruded supported catalyst. Multiple impregnations in combination with one or more extrusions are particularly advantageous in the process of the present invention. The synthesis catalyst obtained has both desirable physical properties, notably having high bulk crush strength and good morphology, as well as a higher cobalt metal loading than would otherwise be achievable following a single impregnation with a fully dissolved solution of a cobalt-containing compound. The reduced catalyst obtained from a reductive activation thus benefits from increased activity in comparison to similar extrudates having lower cobalt loadings, which may be utilized as a means for increasing $C_{5+}$ hydrocarbon selectivity by lowering operation temperatures.

Thus, in a first aspect the present invention provides a process for preparing a supported cobalt-containing Fischer-Tropsch synthesis catalyst, said process comprising the following steps of:
(a) impregnating a support powder or granulate with a cobalt-containing compound;
(b) calcining the impregnated support powder or granulate and extruding to form an extrudate;
or
extruding the impregnated support powder or granulate to form an extrudate and calcining the extrudate; and
(c) impregnating the calcined product with a cobalt-containing compound;
or
forming a powder or granulate of the calcined product, impregnating with a cobalt-containing compound and extruding to form an extrudate.

The loading of cobalt-containing compound on the Ficher-Tropsch synthesis catalyst may be further increased by performing additional loading steps between steps (b) and (c) of the above process. Thus, in a preferred embodiment of the first aspect, after step (b) and prior to step (c), the process further comprises at least one cycle of the intervening steps of:
(i) impregnating the calcined product with a cobalt-containing compound;
or
forming a powder or granulate of the calcined product, impregnating with a cobalt-containing compound and extruding to form an extrudate; and
(ii) calcining the product.

It has been found to be particularly advantageous to include two extrusion steps in the process of the invention, as described hereinbelow. Therefore, in a preferred embodiment of the first aspect of the invention, the process includes at least one step of forming a powder or granulate of the calcined product, impregnating with a cobalt-containing compound and extruding to form an extrudate.

In a second aspect, the present invention provides a process for preparing an extruded cobalt-containing Fischer-Tropsch synthesis catalyst, said process comprising the following steps of:
(a) impregnating a preformed support with a cobalt-containing compound to form an impregnated support;
(b) calcining the impregnated support; and
(c) forming a powder or granulate of the calcined product, impregnating with a cobalt-containing compound and extruding to form an extrudate.

The loading of cobalt-containing compound on the Fischer-Tropsch synthesis catalyst may be further increased by performing additional loading steps between steps (b) and (c) of the above process. Thus, in a preferred embodiment of the second aspect, after step (b) and prior to step (c), the process further comprises at least one cycle of the intervening steps of:
(i) impregnating the calcined product with a cobalt-containing compound;
or
forming a powder or granulate of the calcined product, impregnating with a cobalt-containing compound and extruding to form an extrudate; and
(ii) calcining the product.

Alternatively, or in addition, the loading of cobalt-containing compound on the Fischer-Tropsch synthesis catalyst may be further increased by performing an additional loading step after step (c) of the process of the second aspect. Thus, in another preferred embodiment of the second aspect, after step (c), the process further comprises the additional steps of:
(i) calcining the product; and
(ii) impregnating the calcined product with a cobalt-containing compound and optionally calcining.

In a third aspect, the present invention provides a process for preparing a supported cobalt-containing Fischer-Tropsch synthesis catalyst, said process comprising the following steps of:

(a) impregnating a support powder or granulate with a cobalt-containing compound;

(b) calcining the impregnated support powder or granulate; and (c) impregnating the calcined product with a cobalt-containing compound to form an impregnated support powder or granulate and extruding to form an extrudate.

The loading of cobalt-containing compound on the Fischer-Tropsch synthesis catalyst may be further increased by performing additional loading steps between steps (b) and (c) of the above process. Thus, in an embodiment of the third aspect, after step (b) and prior to step (c), the process further comprises at least one cycle of the intervening steps of:

(i) impregnating the calcined product with a cobalt-containing compound; and (ii) calcining the product.

Reference herein to "impregnation" or "impregnating" is intended to refer to contacting the preformed support or support powder or granulate with a solution of the cobalt-containing compound before drying in order to achieve precipitation of the cobalt-containing compound. Impregnation with a fully dissolved solution of the cobalt-containing compound ensures good dispersion of the cobalt-containing compound on the support material and is thus preferred. This is in contrast to the use of partially dissolved cobalt-containing compound 'solid solutions' where the level of dispersion of the cobalt-containing compound across the surface, and in the pores, of the support material can fluctuate depending on the nature of the precipitation on the support material. Furthermore, use of a fully dissolved solution of the cobalt-containing compound also has less of a negative impact upon the resulting morphology and bulk crush strength of an extrudate formed thereafter, compared with solid solutions. Nevertheless, benefits of the present invention can also be realised in the case where a solid solution of a partially undissolved cobalt-containing compound is used, as discussed hereinbelow.

Where a powder or granulate of a support material is contacted with a solution of cobalt-containing compound in accordance with the invention, the amount of solution used preferably corresponds to an amount of liquid which is suitable for achieving a mixture which is of a suitable consistency for further processing, for example for shaping by extrusion. In that case, complete removal of the solvent of the impregnating solution may be effected after formation of the extrudate. Larger volumes of solution corresponding to higher loadings of cobalt-containing compound can lead to problems with consistency which can preclude satisfactory shaping of the impregnated support material.

Thus, the present invention avoids using a single impregnation of the support material with large volumes of solution of cobalt-containing compound corresponding to high loadings of cobalt-containing compound on the support (e.g. 20 wt. % cobalt on an elemental basis) which give rise to poor physical properties in the supported Fischer-Tropsch synthesis catalyst. The multiple impregnation steps according to the process of the invention are capable of forming a supported cobalt-containing synthesis catalyst with a cobalt concentration, on an elemental basis, of substantially in excess of 10 wt. %, for example 20, 30 or even 40 wt. % of cobalt on an elemental basis, based on the total weight of the supported catalyst.

A loading of up to approximately 10 wt. % of cobalt on elemental basis is achievable per impregnation step with a fully dissolved solution of cobalt-containing compound, without compromising the physical properties of the supported Fischer-Tropsch synthesis catalyst. Impregnating a support powder or granulate with such a solution also ensures that a mixture is obtained which is suitable for extrusion. Larger volumes of solution corresponding to higher loadings of cobalt-containing compound lead to problems with consistency which can preclude satisfactory shaping of the impregnated support material by extrusion. Furthermore, using partially undissolved solid solutions, which require lower volumes of liquid, can negatively impact upon the distribution of cobalt-containing compound across the support and in some cases can lead to poor morphology and low bulk crush strength in an extrudate, as described hereinbefore.

Thus, in preferred embodiments, each impregnation step which is performed during the process adds up to 10 wt. % cobalt, on an elemental basis, up to a maximum cobalt loading on the supported catalyst of 40 wt. %, based on the total weight of the supported synthesis catalyst. Preferably, each impregnation step adds between 7 and 10 wt. % cobalt, on an elemental basis, up to a maximum cobalt loading on the supported catalyst of 40 wt. %, based on the total weight of the supported synthesis catalyst. The number of intervening cycles of steps (i) and (ii), performed after step (b) and prior to step (c) as described above, that may be undertaken is not particularly restricted and may for example be one, two, three or even four cycles depending on the cobalt loading achieved with each step. Further cycles are however energy intensive and the energy expended on further cycles should be weighed against the advantages of incrementally increasing the cobalt loading on supported synthesis catalyst.

A key feature of the process of the present invention is believed to be a step of calcining after each impregnation, which is thought to allow the step-wise loading of cobalt-containing compound onto the support material to afford high cobalt loadings, without recourse to a high-loading solid solution of a partially undissolved cobalt-containing compound typically used with single impregnations. Without being bound by any particular theory, a support material, such as $TiO_2$, is considered to have a natural pore structure (with associated pore volumes) which is energetically favourable for it to adopt, particularly when it is extruded. Overloading cobalt-containing compound in a single impregnation step is believed to disrupt this pore structure and ultimately results in a poorly performing supported catalyst. Alternatively, if a preformed support structure is impregnated with cobalt-containing compound on to it (i.e. there being no extrusion of a support particulate in the presence of a cobalt-containing compound) then the pore structure cannot accommodate the higher loadings satisfactorily without negatively impacting the physical properties of the supported catalyst. However, if a step of calcining is undertaken after impregnating with a cobalt-containing compound at a moderate level (e.g. corresponding to 10 wt. % cobalt on elemental basis or less), then further loading steps can subsequently be applied, without negatively impacting upon the physical properties of the supported catalyst (e.g. morphology and bulk crush strength).

The calcination step is thought to reduce the volume of space occupied by the impregnated cobalt-containing compound upon its conversion to the oxide of the cobalt. For example, there is a substantial loss of volume in conversion of cobalt nitrate, which is often used for impregnating solutions, to the oxide of cobalt. Moreover, the cobalt-containing compound, when undissolved in a solid solution, may also have water of crystallinity associated with it, which further contributes to its overall volume. The contribution of water of crystallinity to the volume of the cobalt-containing compound can be substantially eliminated by means of calcination. Thus, calcination effectively allows more cobalt-containing compound to be accommodated following a subsequent impregnation, without negatively impacting upon the physical properties of the supported catalyst. Multiple impregnations can therefore be used to increase the loading, provided that each impregnation step is followed by a calcination to avoid negatively impacting physical properties as a result of subsequent impregnations.

As an example, in the case of a preformed support comprising no cobalt loading, the support cannot physically accommodate enough cobalt-containing compound for a high loading, unless there is calcination between impregnation steps. If an impregnated support is not calcined before it is subsequently powdered or granulated in preparation for a further impregnation step prior to extrusion, then physical properties will be compromised. This is believed to be at least partly because the extrusion process leads the cobalt-containing compound introduced by impregnation, (which has larger volume than the oxide form of cobalt formed through calcination) to produce larger pores within the extrudate. Any subsequent calcination converts the cobalt-containing compound to the oxide and thereby reduces the volume occupied by the cobalt compound and leaves bubbles in the extrudate which give rise to poor physical properties. Thus, it is the multiple impregnations with intervening calcinations, which is believed to lead to advantages in the extrudates prepared in accordance with the invention.

Meanwhile, it is preferred that any one or more steps of impregnating a support powder or granulate with a cobalt-containing compound in accordance with the invention is followed by an intervening step of calcination prior to extruding to form an extrudate. The support powder or granulate may have been formed from a previously impregnated extrudate; may correspond to a previously impregnated and calcined support powder or granulate; or may correspond to a non-impregnated support powder or granulate. The intervening calcination prior to extrusion helps to avoid the formation of larger pores in the extrudate as a result of the presence of an overly large volume of impregnated cobalt-containing compound during extrusion. This can otherwise exacerbate the presence of bubbles in the extrudate when a subsequent calcination reduces the volume occupied by the cobalt-containing compound.

Forming a powder or granulate of an impregnated support material obtained from an earlier impregnation, for instance by crushing and/or milling/grinding, is also considered to be a particularly beneficial step in conferring desirable qualities to the supported synthesis catalyst. Forming a powder or granulate exposes new surfaces of the impregnated support which are not associated with cobalt-containing compound that can subsequently be impregnated with cobalt-containing compound upon contact during a further impregnation step performed on the powdered or granulated support material. This is considered to be a further means for increasing the loading of cobalt in the supported catalyst, without compromising the physical properties of the synthesis catalyst. Thus, in preferred embodiments, the process of the invention includes at least one step of forming a powder or granulate of a calcined extrudate product (which calcined product may, for instance, derive from calcination of a (preformed) support which has undergone an impregnation or alternatively calcination of an extrudate formed from extruding a powder or granulate of support material which has been impregnated); impregnating the powder or granulate with a cobalt-containing compound, optionally calciningand extruding to form an extrudate. A further advantage of forming an extrudate as part of the process of the invention is that this allows for specific shapes of impregnated support material to be formed which may be tailored for different purposes based on process conditions and reactor designs.

The support material used with the present invention is not particularly limited and may be selected from any suitable refractory metal oxide or silicates known in the art, or combinations thereof. Preferably, the support material is selected from the group consisting of silica, alumina, silica/alumina, ceria, gallia, zirconia, titania, magnesia, zinc oxide, and mixtures thereof. More preferably, the support material is selected from titania and zinc oxide. Most preferably, the support material is selected from titania. An example of a preferred titania support material particulate is titania powder, e.g. P25 Degussa.

Reference herein to a "preformed" support is intended to mean a shaped (for instance, by extrusion) solid support suitable for impregnation, for instance by incipient wetness. Preferably, the preformed support has not undergone any impregnation steps to introduce cobalt-containing compound, or any other materials, thereto. However, preformed supports may be used which have undergone pre-treatments, for instance, the introduction of promoters, dispersion aids, strength aids, binders or other additives. Pre-treatments of the preformed support may also include physical pre-treatments, such as granulation prior to formation of the shaped solid support.

Reference herein to a powder or granulate of a support material is understood to refer to free flowing particles of a support material or particles of support material that have undergone granulation to be a particular shape (e.g. spherical) and size range. In the context of the present invention, the powder or granulate is in a form which is suitable for impregnation by means of a solution of cobalt-containing compound and subsequent extrusion. Preferably, the powder or granulate of a support material, when used as a starting material in the process of the invention, has not undergone any impregnation steps to introduce cobalt-containing compound, or any other materials thereto. However, powders or granulates of a support material may be used which have undergone pre-treatments, for instance, the introduction of promoters, dispersion aids, strength aids, binders or other additives. Pre-treatments of the powders or granulates of a support material may also include physical pre-treatments, such as sieving.

Preferred support materials are substantially free of extraneous metals or elements which might adversely affect the catalytic activity of the system. Thus, preferred support materials are at least 95% w/w pure, more preferably at least 99% w/w pure. Impurities preferably amount to less than 1% w/w, more preferably less than 0.60% w/w and most preferably less than 0.30% w/w. The pore volume of the support is preferably more than 0.50 ml/g and preferably more than 0.8 ml/g. The average pore radius (prior to impregnation with cobalt-containing compound) of the support material is 10 to 500 Å, preferably 15 to 100 Å, more preferably 20 to 80 Å and most preferably 25 to 40 Å. The BET surface area is suitably from 2 to 1000 m$^2$g, preferably from 10 to 600 m$^2$/g, more preferably from 15 to 100 m$^2$/g, and most preferably 30 to 60 m$^2$/g.

The BET surface area, pore volume, pore size distribution and average pore radius may be determined from the nitrogen adsorption isotherm determined at 77K using a Micromeritics TRISTAR 3000 static volumetric adsorption analyser. A procedure which may be used is an application of British Standard methods BS4359:Part 1:1984 'Recommendations for gas adsorption (BET) methods' and BS7591: Part 2:1992, 'Porosity and pore size distribution of materials'—Method of evaluation by gas adsorption. The resulting data may be reduced using the BET method (over the pressure range 0.05-0.20 P/Po) and the Barrett, Joyner & Halenda (BJH) method (for pore diameters of 20-1000 Å) to yield the surface area and pore size distribution respectively.

Suitable references for the above data reduction methods are Brunauer, S, Emmett, P H, & Teller, E, J. Amer. Chem. Soc. 60, 309, (1938) and Barrett, E P, Joyner, L G & Halenda P P, J. Am Chem. Soc., 1951 73 373-380.

In preferred embodiments, where a powder of support material is employed as the starting material for the process of the invention, the powder has a median particle size diameter (d50) of the less than 50 μm, preferably less than 25 μm. Particle size diameter (d50) may suitably be determined by means of a particle size analyser (e.g. Microtrac S3500 Particle size analyser).

Impregnation of the support material with the cobalt-containing compound in accordance with the present invention may be achieved by any suitable method of which the skilled person is aware, for instance by vacuum impregnation, incipient wetness or immersion in excess liquid. The solvent of the impregnating solution may be either an aqueous solvent or a non-aqueous, organic solvent. Suitable non-aqueous organic solvents include, for example, alcohols (e.g. methanol, ethanol and/or propanol), ketones (e.g. acetone), liquid paraffinic hydrocarbons and ethers. Alternatively, aqueous organic solvents, for example an aqueous alcoholic solvent, may be employed. Preferably, the solvent of the impregnating solution is an aqueous solvent.

The concentration of the cobalt-containing compound in the impregnating solution is not particularly limited, although preferably the cobalt-containing compound is fully dissolved. When a powder or granulate of support material is impregnated and immediately followed by an extrusion step, the amount of the impregnating solution is preferably suitable for forming an extrudable paste. Preferably, the concentration of the impregnating solution is sufficient to afford no more than 10 wt. % of cobalt loading, on an elemental basis, in the supported synthesis catalyst. A suitable concentration of cobalt-containing compound is, for example, 0.1 to 15 moles/litre.

Impregnation of the support material in accordance with the present invention also involves sufficient drying of the impregnating solution in order to effect precipitation of the cobalt-containing compound on to the support material and preferably also to remove bound solvent of the impregnating solution (e.g. water). Drying therefore does not lead to decomposition of the cobalt-containing compound or otherwise lead to a change in oxidation state of the cobalt-containing compound. As will be appreciated, in embodiments where an extrusion is performed, complete drying and removal of solvent (e.g. bound solvent) of the impregnating solution may occur after extrusion. Drying in accordance with the present invention is suitably conducted at temperatures from 50° C. to 150° C., preferably 75° C. to 125° C. Suitable drying times are from 5 minutes to 24 hours. Drying may suitably be conducted in a drying oven or in a box furnace, for example, under the flow of an inert gas at elevated temperature.

Suitable cobalt-containing compounds are those which are thermally decomposable to an oxide of cobalt following calcination and which are completely soluble in the impregnating solution. Preferred cobalt-containing compounds are the nitrate, acetate or acetylacetonate of cobalt, most preferably the nitrate of cobalt, for example cobalt nitrate hexahydrate. It is preferred to avoid the use of the halides because these have been found to be detrimental.

Where a preformed support or an extrudate is impregnated in accordance with the present invention, it will be appreciated that the support may be contacted with the impregnating solution by any suitable means including, for instance, vacuum impregnation, incipient wetness or immersion in excess liquid.

Where a powder or granulate of support material is impregnated, the powder or granulate may be admixed with the impregnating solution by any suitable means of which the skilled person is aware, such as by adding the powder or granulate to a container of the impregnating solution and stirring. Where an extrusion step immediately follows impregnation of a powder or granulate, the mixture of powder or granulate and impregnating solution may be further processed if it is not already in a form which is suitable for extruding. For instance, the mixture may be mulled to reduce the presence of larger particles that may not be readily extruded, or the presence of which would otherwise compromise the physical properties of the resulting extrudate. Mulling typically involves forming a paste which is suitable for shaping by extrusion. Any suitable mulling or kneading apparatus of which the skilled person is aware may be used for mulling in the context of the present invention. For example, a pestle and mortar may suitably be used in some applications or a Simpson muller may suitably be employed. Mulling is typically undertaken for a period of from 3 to 90 minutes, preferably for a period of 5 minutes to 30 minutes. Mulling may suitably be undertaken over a range of temperatures, including ambient temperatures. A preferred temperature range for mulling is from 15° C. to 50° C. Mulling may suitably be undertaken at ambient pressures. As stated hereinbefore, it will be appreciated that complete removal of bound solvent from the impregnation solution may be conducted to effect complete precipitation after extrusion.

In embodiments where a calcination step is performed on an impregnated powder or granulate, thereby completely removing solvent of the impregnation solution, the calcined powder or granulate may also be further processed in order to form a mixture which is suitable for extruding. For instance, an extrudable paste may be formed by combining the calcined powder or granulate with a suitable solvent, for example a solvent used for impregnation, preferably an aqueous solvent, and mulled as described above.

In some embodiments, an extrudate or preformed support is converted into a powder or granulate. This may be achieved by any suitable means of which the person of skill in the art is aware. For instance, the impregnated support material, which may in some embodiments be a dry extrudate, may be crushed and/or ground/milled. In preferred embodiments, the powder which is formed has a median particle size diameter (d50) of the less than 50 μm, preferably less than 25 μm. Particle size diameter (d50) may suitably be determined by means of a particle size analyser (e.g. Microtrac S3500 Particle size analyser).

In accordance with the process of the present invention, preparation of the supported Fischer-Tropsch synthesis catalyst involves a calcination step between impregnation steps with cobalt-containing compound. Calcination, as discussed hereinbefore, is required for converting the cobalt-containing compound which has been impregnated on the support material into an oxide of cobalt. Thus, calcination leads to thermal decomposition of the cobalt-containing compound, and not merely removal of bound solvent of an impregnating solution, as in the case of drying in accordance with the present disclosure.

As discussed herein, calcination is critically important for reducing the volume of the cobalt compound to provide more free-pore volume in which further cobalt-containing compound can be incrementally accommodated following further impregnation(s). It is on this basis that increased loadings are attainable without compromising the physical properties of the supported synthesis catalyst by formation of bubbles in the support. As a result, multiple impregnation steps with intervening calcination(s) also ensures good mechanical strength in the supported synthesis catalyst since bubble formation, which weakens the support, is avoided. Calcination may be performed by any method known to those of skill in the art, for instance in a fluidized bed or rotary kiln at a temperature suitably in the range of from 150° C. to 700° C. In some embodiments, calcination may be conducted as part of an integrated process where calcination and reductive activation of the synthesis catalyst to yield the reduced synthesis catalyst are performed in the same reactor.

The process of the present invention has been found to be particularly suitable for increasing the loading of cobalt on a supported Fischer-Tropsch synthesis catalyst. The amount of cobalt, on an elemental basis, on the supported catalyst obtained in accordance with the process of the present invention is at least 15 wt. %, based on the total weight of the synthesis catalyst. A preferred range of cobalt concentrations, on an elemental basis, for the synthesis catalyst obtained in accordance with the process of the present invention is from 15 to 35 wt. %, based on the total weight of the synthesis catalyst, more preferably 18 to 30 wt. %, most preferably 20 to 25 wt. %, based on the total weight of the synthesis catalyst. A supported synthesis catalyst containing in excess of 35 wt. % of cobalt, on an elemental basis, is likely to be overly costly to prepare and is therefore less preferred. As will be appreciated by the skilled person, the amount of cobalt, on an elemental basis, on the synthesis catalyst may be readily determined by x-ray fluorescence (XRF) techniques.

The supported Fischer-Tropsch synthesis catalyst prepared in accordance with the process of the present invention may additionally comprise one or more promoters, dispersion aids or binders. Promoters are typically added to promote reduction of an oxide of cobalt to cobalt metal, preferably at lower temperatures. Preferably, the one or more promoters is selected from the list consisting of ruthenium, palladium, platinum, rhodium, rhenium, manganese, chromium, nickel, iron, molybdenum, tungsten, zirconium, gallium, thorium, lanthanum, cerium and mixtures thereof. Promoter is typically used in a cobalt to promoter atomic ratio of up to 250:1 and more preferably up to 125:1, still more preferably up to 25:1, and most preferably 10:1.

The addition of the promoters, dispersion aids, strength aids, or binders may be integrated at several stages of the process according to the present invention. Preferably, the promoter dispersion aids or binders are admixed during one or more impregnation steps, for example in step (a) and/or step (c) of the process. The process of the present invention allows for the preparation of a supported Fischer-Tropsch synthesis catalyst having a cobalt loading substantially increased over that which is obtainable from a single impregnation with a fully dissolved solution, whilst retaining a workable material for further use. Consequently, a reduced synthesis catalyst obtained by means of the process of the present invention has commensurately higher activity in Fischer-Tropsch reactions. Meanwhile, the reduced synthesis catalyst which is formed following the process of the present invention also simultaneously benefits from high bulk crush strength and good morphology. The combination of good physical properties in the reduced synthesis catalyst and high cobalt loading has hitherto not been realised.

The Fischer-Tropsch synthesis catalyst prepared in accordance with the present invention may conveniently be converted into a reduced Fischer-Tropsch synthesis catalyst by reductive activation by any known means of which the skilled person is aware which is capable of converting cobalt oxide to the active cobalt metal. Thus, in one embodiment, the process of the invention further comprises reducing the cobalt-containing Fischer-Tropsch synthesis catalyst obtained to form a reduced Fischer-Tropsch synthesis catalyst.

In a further aspect, the present invention also provides a supported cobalt-containing Fischer-Tropsch synthesis catalyst prepared by the process described herein.

The step of forming a reduced synthesis catalyst may be carried out batch wise or continuously in a fixed bed, fluidised bed or slurry phase reactor. The reduced synthesis catalyst formed following the reductive activation process is useful in the heterogeneously catalysed production of hydrocarbons from syngas by Fischer-Tropsch synthesis, for example in the production of a diesel or aviation fuel or precursor thereof. Fischer-Tropsch synthesis of hydrocarbons from syngas may be represented by Equation 1:

$$_mCO + _{(2m+1)}H_2 \rightarrow _mH_2O + C_mH_{2m+2} \qquad \text{Equation 1}$$

As discussed hereinbefore, the process of the present invention has been surprisingly found to afford a Fischer-Tropsch catalyst exhibiting high $C_{5+}$ hydrocarbon selectivity. Furthermore, at least in some embodiments, the catalytic activity has also been found to be superior. The cobalt-containing Fischer-Tropsch catalyst produced according to the process of the present invention therefore provides gasoline range hydrocarbons when used in a Fischer-Tropsch reaction.

Thus, in another aspect, the present invention also provides a process for converting a feed comprising a mixture of hydrogen and carbon monoxide gases, preferably in the form of a synthesis gas mixture, to hydrocarbons, which process comprises contacting a mixture of hydrogen and carbon monoxide with a reduced cobalt-containing Fischer-Tropsch catalyst as defined hereinbefore. In a related aspect, the present invention also provides a product, preferably a fuel, comprising hydrocarbons obtained from the above process for converting a feed by contacting with a reduced cobalt-containing Fischer-Tropsch catalyst as defined hereinbefore.

In the Fischer-Tropsch reaction described above, the volume ratio of hydrogen to carbon monoxide ($H_2$:CO) in the gaseous reactant mixture is preferably in the range of from 0.5:1 to 5:1, more preferably from 1:1 to 3:1, and most preferably 1.6:1 to 2.2:1. The gaseous reactant stream may also comprise other gaseous components, such as nitrogen, carbon dioxide, water, methane and other saturated and/or unsaturated light hydrocarbons, each preferably being present at a concentration of less than 30% by volume. The temperature of the Fischer-Tropsch reaction is preferably in the range from 100 to 400° C., more preferably from 150 to 350° C., and most preferably from 150 to 250° C. The pressure is preferably in the range from 1 to 100 bar (from 0.1 to 10 MPa), more preferably from 5 to 75 bar (from 0.5 to 7.5 MPa), and most preferably from 10 to 50 bar (from 1.0 to 5.0 MPa).

In yet another aspect, the present invention also provides a use of a reduced cobalt-containing Fischer-Tropsch synthesis catalyst as defined hereinbefore for the conversion of a mixture hydrogen and carbon monoxide, preferably in the form of a synthesis gas mixture, to hydrocarbons.

The present invention will now be illustrated by way of the following examples and with reference to the following figures.

EXAMPLES

General Experimental Procedure for Catalyst Extrudate Preparation (Double Impregnation-Double Extrusion)

Stage 1—First Impregnation-Extrusion:

Cobalt nitrate hexahydrate mentioned below was obtained from Alfa Aesar ACS 98-102% (code 36418) and the titania used was P25 aeroxide from Evonik. The 1.6 mm trilobe dies mentioned were made by JMP industries.

Deionised water was added to an amount of cobalt nitrate hexahydrate. The mixture was heated to about 40° C. or less and stirred to totally dissolve the cobalt nitrate. (For a 10 wt. % cobalt loading, 550 g of cobalt nitrate hexahydrate may be used per 1000 g of titanium dioxide.) The resulting impregnating solution was then added to an amount of titanium dioxide powder, before the resulting mixture was hand mixed to a form a light paste. The paste was then added to a Simpson Muller before being mulled for 5 minutes to yield a clay-like pink paste. The paste was subsequently added to a Bonnet Extruder before the paste was extruded onto steel pans with a maximum extrudate depth of 5 cm. The extrudate was then transferred to a box furnace and dried and calcined following a temperature program of: 60° C.-1 hr; 120° C.-4 hr; 200° C.-2 hr, cool to 60° C. and hold in a box furnace (ramp rates at 2° C./min).

Stage 2—Second Impregnation-Extrusion:

An amount of the dried and calcined extrudate from Stage 1 was added to a muller and mulled for 45 minutes to produce a powder of particle size of d50<15 µm. The mass of titania in the powder was calculated and the amount of cobalt nitrate needed for an additional 10 wt. % loading was determined. The determined amount of cobalt nitrate hexahydrate was totally dissolved in deionised water with gentle heating (<40° C.) and stirring. The resulting impregnating solution was added to the mulled powder in the muller before the mixture was mulled for 5 to 10 minutes to produce a black paste. The paste was subsequently transferred to the Bonnet extruder and extruded using a 1.6 mm trilobe die onto a tray with a maximum extrudate depth of 5 cm. The extrudate was then transferred to a box furnace for drying and calcination, following a temperature program of: 60° C.-5 hr; 120° C.-5 hr; 300° C.-2 hr; cool to 60° C. and hold (ramp rates at 2° C./min).

The cobalt impregnating solutions used in either impregnation steps may additionally contain promoters, dispersion aids, strength aids and or binders. Stage 2 may be repeated to reach higher loadings while also maintaining strength and morphology. Each impregnation typically loads 7-10% cobalt.

Catalyst Reduction

Catalyst extrudates were loaded into a fixed bed testing reactor with or without stacked dilution. Bed dilutions were used to control exotherms on the catalyst, where necessary. The catalyst extrudates were reductively activated using the following procedure:

Drying: $N_2$ was passed over the catalyst bed while the temperature was ramped from room temperature to 120° C., which temperature was held for 15 mins.

Reductive Activation: a mixture of 50/50% v/v $H_2/N_2$ was passed over the catalyst bed and the temperature was raised from 120° C. to the activation temperature, which temperature was held for 15 hours before cooling to 90° C.

Syngas: at 90° C. the $H_2/N_2$ mixture was replaced by a syngas mixture and the temperature was ramped incrementally from T=90° C. to T=170° C.

Fischer-Tropsch Synthesis Reactions

Each catalyst was run for a sufficient period to obtain steady state conditions and temperature adjusted to provide a particular level of CO conversion (typically between about 60 and 65%). Exit gasses were sampled by on-line GC and analysed for gaseous products. The He was used as an internal standard, the $C^{5+}$ productivity is determined by difference from the $C_1$ to $C_4$ components in the gas phase. The productivity of the catalyst is defined as the weight in grams of products containing 5 carbon atoms or more, formed over the catalyst per litre of packed catalyst volume per hour of reaction time.

Tables 1 to 5 below and FIGS. 1 to 3 appended hereto show the results of Fischer-Tropsch synthesis reactions conducted in accordance with the above general procedure with reduced catalysts obtained in accordance with the above activation procedure. Several catalysts with different cobalt (10, 20 or 30 wt. %) and promoter loadings (0% or 1%) were tested.

Table 6 below shows the results of bulk crush strength testing for synthesis catalysts with 20 wt. % cobalt loading and including promoter (1wt. %) prepared in accordance with the present invention with intervening and final calcinations at 300° C. or 500° C. Results are also provided for synthesis catalysts with cobalt loadings of 20 wt. %, and also including 1% total promoter, prepared from a single impregnation with a solid solution of cobalt-containing compound and including a final calcination at 300° C. or 550° C. Single particle crush strength was determined in accordance with ASTM method No. D6175-03.

Reduced catalysts having cobalt loadings of 10 wt. % are derived from extrudates prepared following a single impregnation and a single extrusion (not in accordance with the present invention). Reduced catalysts having cobalt loadings of 20 wt. % were obtained from extrudates prepared in accordance with the process of the present invention comprising a double impregnation/double extrusion with intervening calcination and powder forming steps. Reduced catalysts having cobalt loadings of 30 wt. % were obtained from extrudates prepared in accordance with the process of the present invention comprising a triple impregnation/triple extrusion process with two intervening calcination and powder forming steps.

In Tables 1 to 5, CO conversion is defined as moles of CO used/moles of CO fed×100 and carbon selectivity as moles of CO attributed to a particular product/moles of CO converted×100.

Figure 1:
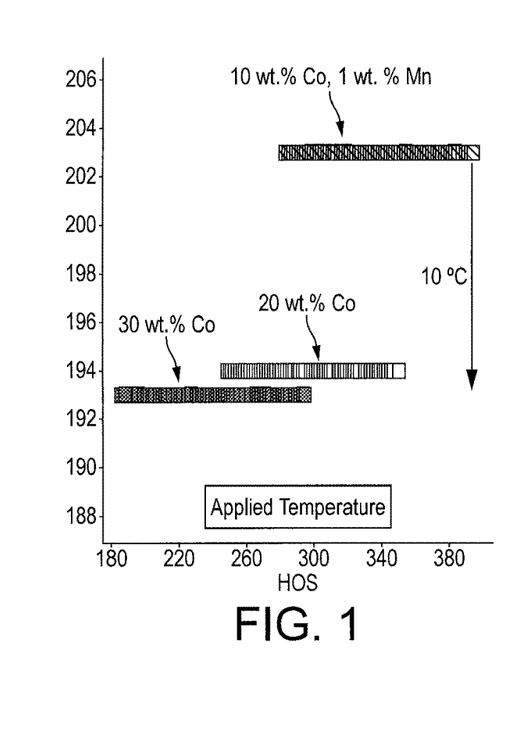
FIG. 1: Graphical representation of applied temperature in a Fischer-Tropsch synthesis reaction against time of catalyst exposure to a feed stream ("hours on stream"-HOS)
Figure 2:
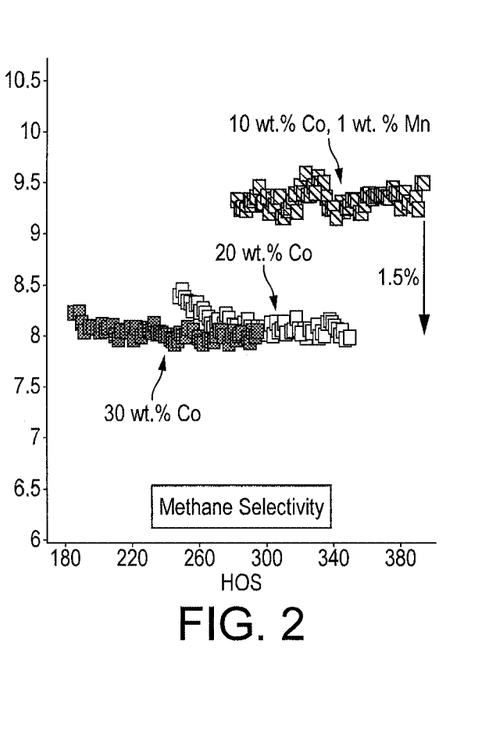
FIG. 2: Graphical representation of methane selectivity (%) in a Fischer-Tropsch synthesis reaction against time of catalyst exposure to a feed stream ("hours on stream"-HOS)
Figure 3:
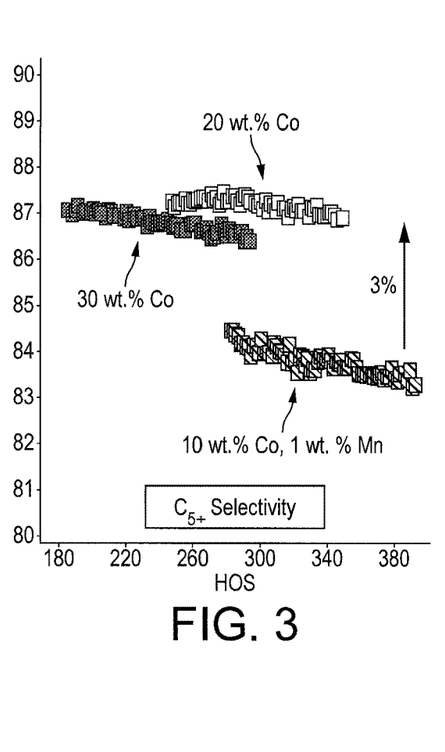
FIG. 3: Graphical representation of $C_{5+}$ selectivity (%) in a Fischer-Tropsch synthesis reaction against time of catalyst exposure to a feed stream ("hours on stream"-HOS)

FIGS. 1 to 3 appended hereto illustrate the surprising effects of the catalyst preparation process of the present invention through a comparison of higher loaded reduced catalysts (20 and 30 wt. % cobalt) derived from catalysts prepared in accordance with the present invention and lower loaded reduced catalyst (10 wt. % cobalt) and higher loaded reduced catalyst (20 wt. % cobalt) derived from a catalyst which is not prepared in accordance with the present invention.

FIG. 1 shows the applied temperature used for achieving comparable levels of CO conversion (approximately 60-65%) for the higher loaded reduced catalysts (20 and 30 wt. % cobalt) obtained in accordance with the present invention and lower loaded reduced catalyst (10 wt. % cobalt) which was not obtained in accordance with the present invention. FIG. 1 demonstrates that, for a similar level of CO conversion achieved with each catalyst, the applied temperatures are significantly lower for the reduced catalysts obtained from catalysts prepared in accordance with the present invention which contain high loadings of cobalt (20 and 30 wt. %). As depicted in FIG. 1, the applied temperatures for the higher loaded catalysts are approximately 10° C. lower than for the 10 wt. % cobalt catalyst. The results in Table 1 also demonstrate that a comparable level of CO conversion is obtainable at lower applied temperature for a higher loaded 20 wt. % cobalt catalyst versus a lower loaded 10 wt. % cobalt catalyst.

FIGS. 2 and 3 demonstrate the effects of higher cobalt loading in the Fischer-Tropsch synthesis catalyst, together with lower applied temperatures, on methane and $C_{5+}$ selectivity respectively. FIG. 2 demonstrates that by increasing the cobalt loading in the catalysts by means of the process of the present invention, thus allowing the use of lower applied temperatures, methane selectivity is lowered. In contrast, FIG. 3 demonstrates that by increasing the cobalt loading in the catalysts by means of the process of the present invention, thus allowing the use of lower applied temperatures, $C_{5+}$ selectivity is desirably increased.

Table 2 below illustrates the advantage of an unpromoted catalyst having a higher loading of for instance 20 wt. % cobalt versus a lower loaded conventional promoted 10 wt. % cobalt catalyst. The results of table 2 show that $C_{5+}$ selectivity is 2% higher for the unpromoted 20 wt. % cobalt catalyst and, notably, the LPG selectivity is 1.5% lower, in comparison with the 10 wt. % cobalt catalyst with 1% manganese promoter.

Table 6 shows that bulk crush strength is far superior for the synthesis catalysts prepared in accordance with the present invention compared with those having the same cobalt loading and total promoter loading but which are prepared with only a single impregnation with a solid solution of cobalt-containing compound. This is a result of the poor morphology which results from overloading a support with cobalt-containing compound and extruding, thereby forming large pores in the support. Following calcination, the large pores are no longer as well filled by the cobalt oxide, which is of smaller volume than the cobalt-containing compound used for impregnation, and a bubbled structure results. This is well illustrated in FIGS. 4 to 11 which show, by means of microscope images of the surface of supported catalysts, the results of overloading a support material and extruding.

Figure 4:
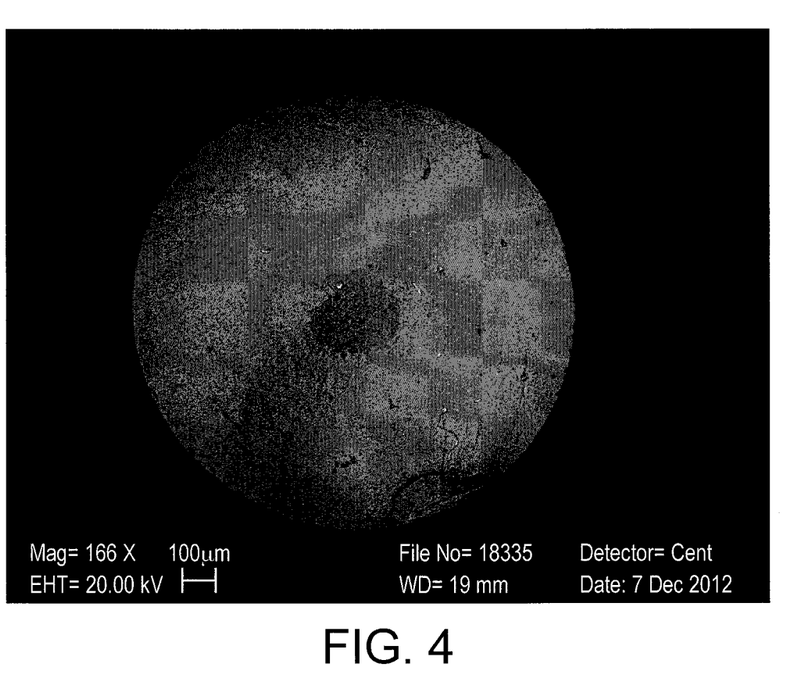
FIG. 4: Microscope image of a plain titania extrudate surface.
Figure 5:
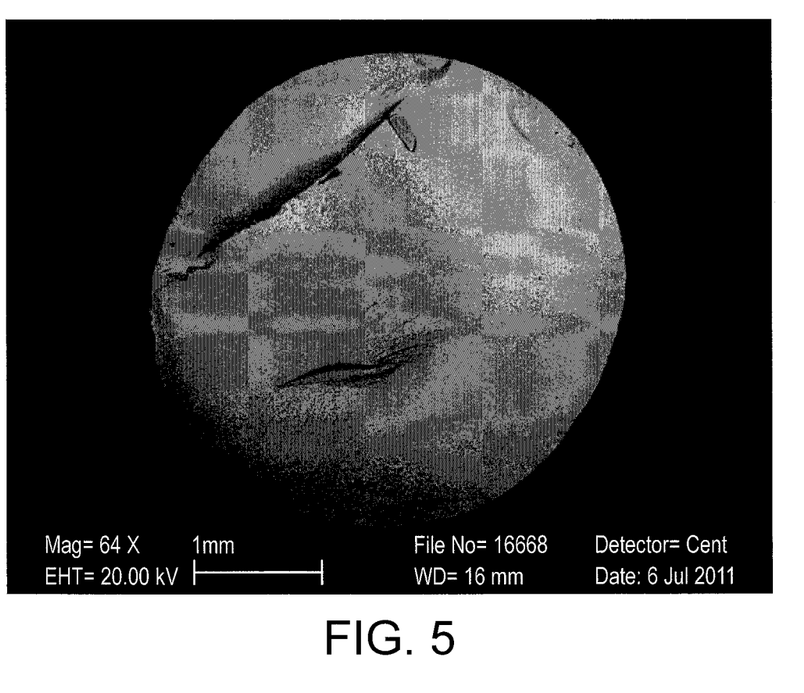
FIG. 5: Microscope image of a catalyst surface for a supported catalyst comprising a cobalt loading of 10 wt. % prepared by a single impregnation of a support powder followed by a single extrusion (not in accordance with the present invention)
Figure 6:
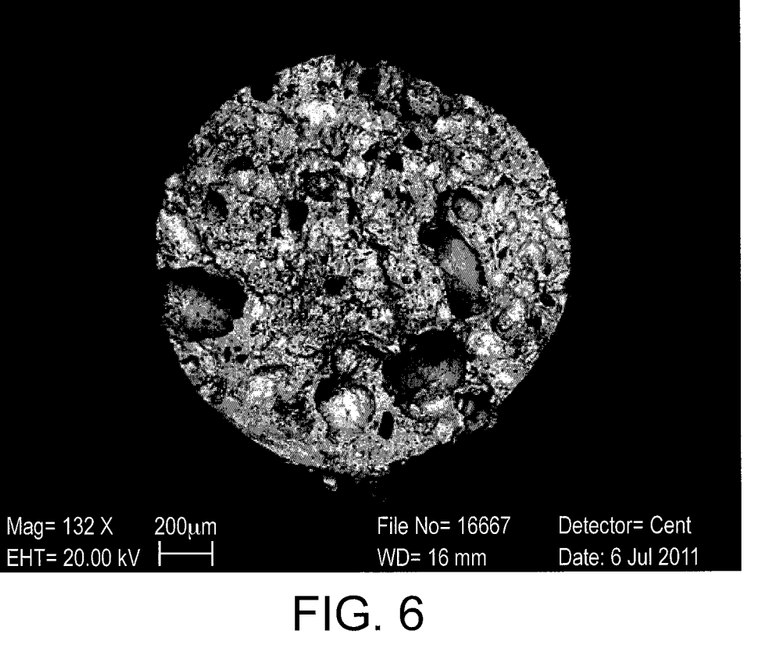
FIG. 6: Microscope image of catalyst surface for a supported catalyst comprising a cobalt loading of 20 wt. % prepared by a single impregnation of a support powder with a solid solution followed by a single extrusion (not in accordance with the present invention)
Figure 7:
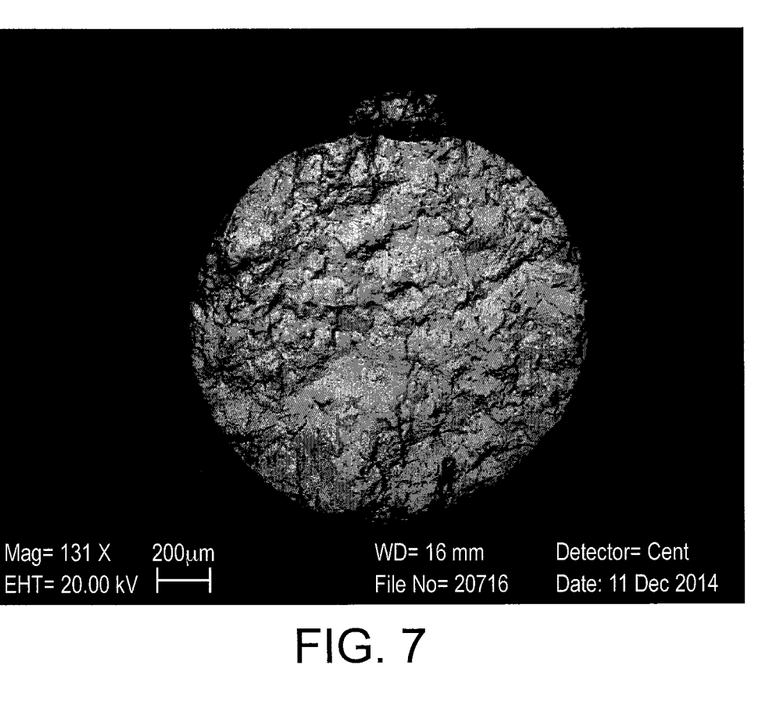
FIG. 7: Microscope image of catalyst surface for a supported catalyst comprising a cobalt loading of 20 wt. % prepared by a double impregnation, double extrusion with intervening calcination (in accordance with an embodiment of the present invention).
Figure 8:
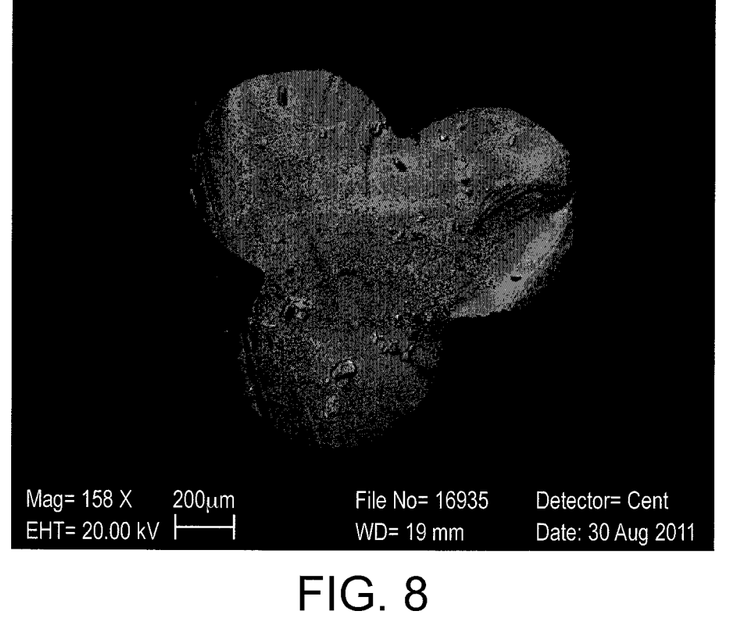
FIG. 8: Microscope image of a plain titania trilobe extrudate surface.
Figure 9:
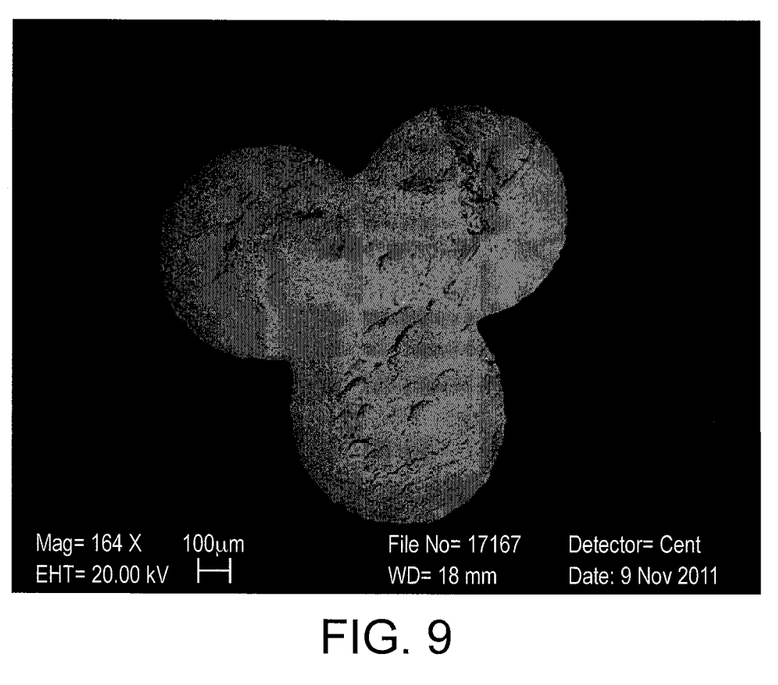
FIG. 9: Microscope image of a catalyst surface for a supported trilobe shaped catalyst comprising a cobalt loading of 10 wt. % prepared by a single impregnation of a support powder followed by a single extrusion (not in accordance with the present invention)
Figure 10:
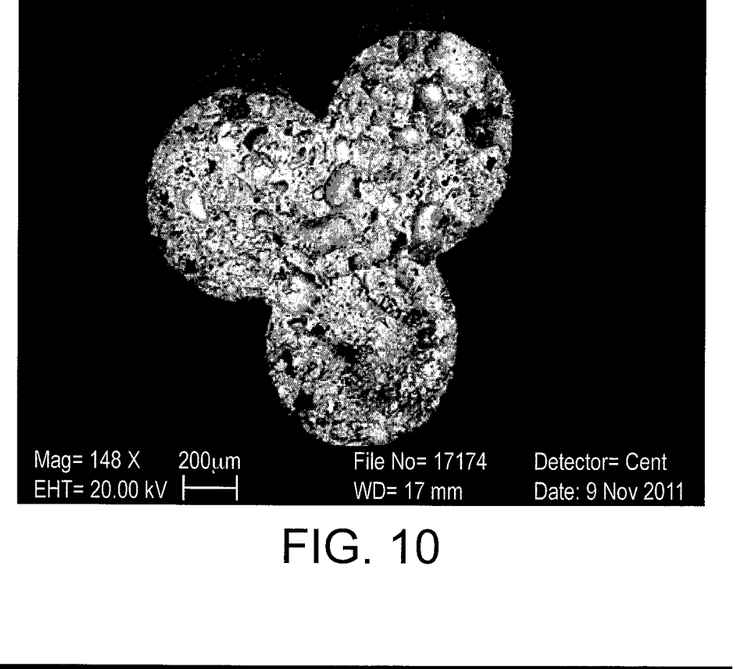
FIG. 10: Microscope image of catalyst surface for a supported trilobe shaped catalyst comprising a cobalt loading of 20 wt. % prepared by a single impregnation of a support powder with a solid solution followed by a single extrusion (not in accordance with the present invention)
Figure 11:
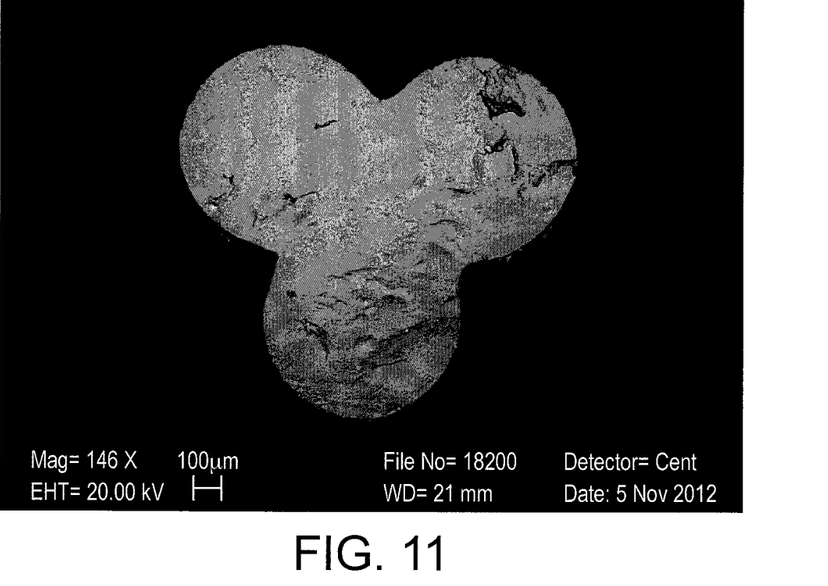
FIG. 11: Microscope image of catalyst surface for a supported trilobe shaped catalyst comprising a cobalt loading of 20 wt. % prepared by a double impregnation, double extrusion with intervening calcination (in accordance with an embodiment of the present invention).

FIGS. 4 and 8 show microscope images of plain titania extrudate surfaces having good morphology with no evidence of any bubbles present. FIGS. 5 and 9 show microscope images of catalyst surfaces for supported catalysts comprising a cobalt loading of 10 wt. % prepared by a single impregnation of a support powder with a fully dissolved solution of cobalt-containing compound followed by a single extrusion step (not in accordance with the present invention). The 10 wt. % loaded catalysts display good morphologies with no evidence of any bubbles present. In contrast, FIGS. 6 and 10 show microscope images of catalyst surfaces for supported catalysts comprising cobalt loadings of 20 wt. % prepared by a single impregnation of a support powder with a solid solution followed by a single extrusion (not in accordance with the present invention). FIGS. 6 and 10 show poor morphologies in the extrudates with evidence of severe bubble formation. FIGS. 7 and 11 show microscope images of catalyst surfaces for supported catalysts comprising cobalt loadings of 20 wt. % prepared by a double impregnation with a fully dissolved solution of cobalt-containing compound and double extrusion with intervening calcination and powder forming steps (in accordance with an embodiment of the present invention). Despite the high cobalt loadings on the extrudates, FIGS. 7 and 11 show that good morphology is retained, with no evidence of bubbling.

It is clear that a bubbled structure results from overloading a support and its pore structure. The process of the present invention is capable of affording higher cobalt loadings in an extruded Fisher-Tropsch catalyst whilst maintaining good morphology and high bulk crush strength, which has hitherto not been possible.

TOS=Time On Stream (h)
Conv=CO conversion (%)
$CH_4$=$CH_4$ Selectivity (%)
LPG=LPG Selectivity (%)
$C_{5+}S$=$C_{5+}$ Selectivity (%)
$C_{5+}P$=$C_{5+}$ Productivity (g/L·h)
T=Catalyst Bed Temperature (° C.)
GHSV=Gas Hourly Space Velocity ($h^{-1}$) (gas volumes converted to standard temperature and pressure)

TABLE 1

| Catalyst loading | TOS (h) | Conv (%) | CH$_4$ (%) | LPG (%) | C$_{5+}$S (%) | C$_{5+}$P (%) | T (°C.) | GHSV (h$^{-1}$) | P (MPa) | H$_2$:CO |
|---|---|---|---|---|---|---|---|---|---|---|
| *10% Co | 128 | 60.8 | 11.8 | 7.5 | 80.6 | 118 | 202 | 1339 | 3 | 1.8 |
| *20% Co | 125 | 59.0 | 13.3 | 9.3 | 77.4 | 110 | 209 | 1339 | 3 | 1.8 |
| 20% Co | 128 | 60.0 | 8.2 | 5.0 | 86.7 | 124 | 188 | 1339 | 3 | 1.8 |

*Not of the invention—single impregnation

TABLE 2

| Catalyst loading | TOS (h) | Conv (%) | CH$_4$ (%) | LPG (%) | C$_{5+}$S (%) | C$_{5+}$P (%) | T (°C.) | GHSV (h$^{-1}$) | P (MPa) | H$_2$:CO |
|---|---|---|---|---|---|---|---|---|---|---|
| 30% Co | 135 | 62.6 | 9.1 | 4.9 | 86.1 | 125 | 193 | 1250 | 3 | 1.8 |
| 20% Co | 183 | 64.2 | 10.5 | 4.8 | 84.7 | 126 | 198 | 1250 | 3 | 1.8 |
| *10% Co, 1% Mn | 183 | 64.4 | 11.1 | 6.3 | 82.7 | 120 | 203 | 1250 | 3 | 1.8 |
| 20% Co, 1% Mn | 124 | 66.6 | 9.0 | 5.4 | 85.6 | 129 | 197 | 1250 | 3 | 1.8 |

*Not of the invention—single impregnation

TABLE 3

| Catalyst loading | TOS (h) | Conv (%) | CH$_4$ (%) | LPG (%) | C$_{5+}$S (%) | C$_{5+}$P (%) | T (°C.) | GHSV (h$^{-1}$) | P (MPa) | H$_2$:CO |
|---|---|---|---|---|---|---|---|---|---|---|
| 30% Co | 294 | 63.4 | 8.0 | 5.5 | 86.4 | 128 | 193 | 1250 | 4.2 | 1.8 |
| 20% Co | 308 | 63.8 | 8.0 | 4.8 | 87.1 | 128 | 194 | 1250 | 4.2 | 1.8 |
| *10% Co, 1% Mn | 304 | 65.4 | 9.3 | 6.8 | 83.9 | 124 | 203 | 1250 | 4.2 | 1.8 |
| 20% Co, 1% Mn | 220 | 65.8 | 7.4 | 6.0 | 86.5 | 130 | 196 | 1250 | 4.2 | 1.8 |

*Not of the invention—single impregnation

TABLE 4

| Catalyst loading | TOS (h) | Conv (%) | CH$_4$ (%) | LPG (%) | C$_{5+}$S (%) | C$_{5+}$P (%) | T (°C.) | GHSV (h$^{-1}$) | P (MPa) | H$_2$:CO |
|---|---|---|---|---|---|---|---|---|---|---|
| *10% Co, 1% Mn | 198 | 64.1 | 10.7 | 5.8 | 83.4 | 123 | 197 | 1250 | 3 | 1.8 |
| *10% Co, 0% Mn | 198 | 65.3 | 19.3 | 10.3 | 70.5 | 106 | 218 | 1250 | 3 | 1.8 |
| 20% Co, 1% Mn | 197 | 62.5 | 8.9 | 4.5 | 86.7 | 124 | 189 | 1250 | 3 | 1.8 |
| 30% Co, 1% Mn | 196 | 62.6 | 8.1 | 4.5 | 87.3 | 127 | 181 | 1250 | 3 | 1.8 |
| 30% Co, 0% Mn | 197 | 62.4 | 8.6 | 4.2 | 87.0 | 126 | 182 | 1250 | 3 | 1.8 |

*Not of the invention—single impregnation

TABLE 5

| Catalyst loading | TOS (h) | Conv (%) | CH$_4$ (%) | LPG (%) | C$_{5+}$S (%) | C$_{5+}$P (%) | T (°C.) | GHSV (h$^{-1}$) | P (MPa) | H$_2$:CO |
|---|---|---|---|---|---|---|---|---|---|---|
| *10% Co, 1% Mn | 350 | 63.6 | 8.6 | 7.2 | 84.3 | 122 | 197 | 1250 | 4.2 | 1.8 |
| *10% Co, 0% Mn | 270 | 65.6 | 12.9 | 6.2 | 81.0 | 122 | 205 | 1250 | 4.2 | 1.8 |
| 20% Co, 1% Mn | 270 | 63.2 | 7.5 | 5.2 | 87.2 | 127 | 188 | 1250 | 4.2 | 1.8 |
| 30% Co, 1% Mn | 270 | 62.8 | 7.3 | 5.5 | 87.2 | 126 | 181 | 1250 | 4.2 | 1.8 |
| 20% Co, 0% Mn | 350 | 63.0 | 9.3 | 4.9 | 85.8 | 128 | 190 | 1250 | 4.2 | 1.8 |
| 30% Co, 0% Mn | 350 | 63.6 | 7.8 | 5.8 | 87.3 | 130 | 184 | 1250 | 4.2 | 1.8 |

*Not of the invention—single impregnation

TABLE 6

| Code | Catalyst Description | Single Particle Crush Strength, N (lbf) |
|---|---|---|
| C1312159 | 20% Co, 1% Mn—(300° C. calcination, double impregnation-double extrusion) | 24.9 (5.60) |
| C1211619 | 20% Co, 1% Mn—(500° C. calcination, double impregnation-double extrusion) | 39.6 (8.90) |
| C1108801 | *20% Co, 0.5% Mn, 0.5% V—(300° C. calcination, single impregnation-single extrusion) | 6.05 (1.36) |
| C1211380 | *20% Co, 0.5% Mn, 0.5% V—(550° C. calcination, single impregnation-single extrusion) | 10.7 (2.41) |

*Not of the invention—single impregnation

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope and spirit of this invention.

The invention claimed is:

1. A process for preparing a titania supported cobalt-containing Fischer-Tropsch synthesis catalyst, said process comprising:
   (a) impregnating a titania support powder or granulate with a cobalt-containing compound;
   (b) calcining the impregnated titania support powder or granulate and extruding the calcined impregnated titania support powder or granulate to form an extrudate; or
   extruding the impregnated titania support powder or granulate to form an extrudate and calcining the extrudate; and
   (c) impregnating the calcined product with a cobalt-containing compound; or
   forming a powder or granulate of the calcined product, and impregnating the powder or granulate of the calcined product with a cobalt-containing compound and extruding to form an extrudate,
   wherein:
   the catalyst contains cobalt in an amount of up to 30 wt. % on an elemental basis; and
   the titania support powder or granulate is at least 95 wt. % titania and comprises no alumina or silica.

2. A process according claim 1, wherein the process includes at least one step of forming a powder or granulate of the calcined product, impregnating with a cobalt-containing compound and extruding to form an extrudate.

3. A process according to claim 1, wherein any one or more steps of impregnating a support powder or granulate with a cobalt-containing compound is followed by an intervening step of calcination of the impregnated support powder or granulate prior to extruding to form an extrudate.

4. A process according to claim 1, wherein the process further comprises calcining the impregnated support material or extrudate obtained in step (c).

5. A process according to claim 1, wherein calcining steps are conducted at a temperature of from 150° C. to 700° C.

6. A process according to claim 1, wherein each impregnation that is performed during the process adds up to 10 wt. % cobalt, on an elemental basis.

7. A process according to claim 1, wherein prior to any extrusion, the powdered or granulated support material is mulled with the cobalt-containing compound.

8. A process according to claim 1, wherein any forming a powder or granulate comprises crushing, milling or grinding, or a combination thereof.

9. A process according to claim 1, wherein the powder or granulate formed during any step of forming a powder or granulate has a median particle size diameter (d50) of less than 50 μm.

10. A process according to claim 1, wherein the cobalt-containing Fischer-Tropsch synthesis catalyst obtained comprises one or more promoters, dispersion aids, strength aids, binders, or a combination thereof.

11. A process according to claim 10, wherein the one or more promoters, dispersion aids, binders or a combination thereof are introduced during one or more of the impregnation steps.

12. A process according to claim 10, wherein the one or more promoters is selected from the group consisting of ruthenium, palladium, platinum, rhodium, rhenium, manganese, chromium, nickel, iron, molybdenum, tungsten, zirconium, gallium, thorium, lanthanum, cerium and mixtures thereof.

13. A process according to claim 1, wherein the cobalt-containing compound is a nitrate, acetate or acetylacetonate of cobalt.

14. A process according to claim 1, further comprising reducing the cobalt-containing Fischer-Tropsch synthesis catalyst obtained to form a reduced Fischer-Tropsch synthesis catalyst.

15. A process according to claim 1, wherein the supported cobalt-containing Fischer-Tropsch synthesis catalyst contains cobalt, on an elemental basis, in the range of 15 wt % to 35 wt %.

16. A process according to claim 1, wherein the supported cobalt-containing Fischer-Tropsch synthesis catalyst contains cobalt, on an elemental basis, in the range of 18 wt % to 30 wt %.

17. A process according to claim 1, wherein the supported cobalt-containing Fischer-Tropsch synthesis catalyst contains cobalt, on an elemental basis, in the range of up to 25 wt %.

18. A process according to claim 1, wherein the supported cobalt-containing Fischer-Tropsch synthesis catalyst contains 20 wt % Co, and a single particle crush strength in the range of 24.9 N to 39.6 N.

19. A process according to claim 1, wherein step (b) comprises calcining the impregnated titania support powder or granulate and extruding the calcined impregnated titania support powder or granulate to form an extrudate.

20. A process according to claim 1, wherein step (b) comprises extruding the impregnated titania support powder or granulate to form an extrudate and calcining the extrudate.

\* \* \* \* \*